United States Patent
Lund et al.

(10) Patent No.: US 6,945,495 B1
(45) Date of Patent: Sep. 20, 2005

(54) HYDROGEN POWERED TOY ROCKET UTILIZING HYDROGEN FROM THE ELECTROLYSIS OF WATER

(75) Inventors: Bruce D. Lund, Chicago, IL (US); Michael Starrick, Maywood, IL (US)

(73) Assignee: Lund and Company Invention, L.L.C., Chicago, IL (US)

( * ) Notice: Subject to any disclaimer, the term of this patent is extended or adjusted under 35 U.S.C. 154(b) by 11 days.

(21) Appl. No.: 10/889,525

(22) Filed: Jul. 12, 2004

Related U.S. Application Data

(63) Continuation-in-part of application No. 10/348,830, filed on Jan. 22, 2003, now Pat. No. 6,820,840.

(60) Provisional application No. 60/353,161, filed on Jan. 30, 2002.

(51) Int. Cl.[7] .................................................. B64F 1/04
(52) U.S. Cl. ........................................ 244/63; 124/71
(58) Field of Search ............................ 244/169, 63, 74; 124/71, 73–77; 89/7; 60/203; 204/262; 446/56, 446/52

(56) References Cited

U.S. PATENT DOCUMENTS

| | | | |
|---|---|---|---|
| 1,620,994 A * | 3/1927 | Bustamante | 89/7 |
| 3,490,235 A * | 1/1970 | Grant | 60/200.1 |
| 4,345,729 A * | 8/1982 | Barter | 244/169 |
| 4,664,631 A * | 5/1987 | Pederson et al. | 434/16 |
| 5,399,251 A * | 3/1995 | Nakamats | 204/262 |
| 6,321,737 B1 * | 11/2001 | Johnson et al. | 124/73 |

* cited by examiner

*Primary Examiner*—Galen Barefoot
(74) *Attorney, Agent, or Firm*—Much Shelist Freed Denenberg Ament & Rubenstein, PC

(57) ABSTRACT

A toy rocket assemblage including a chamber containing water and an anode and cathode and a power supply for the anode and cathode to generate oxygen and hydrogen in the chamber. A plenum chamber for collecting the oxygen and hydrogen gasses. A toy rocket on a launch tube in communication with the plenum chamber and a glow wire igniter in the plenum chamber which when heated ignites the oxygen and hydrogen gas mixture to drive the rocket off of the launch tube into the atmosphere.

6 Claims, 2 Drawing Sheets

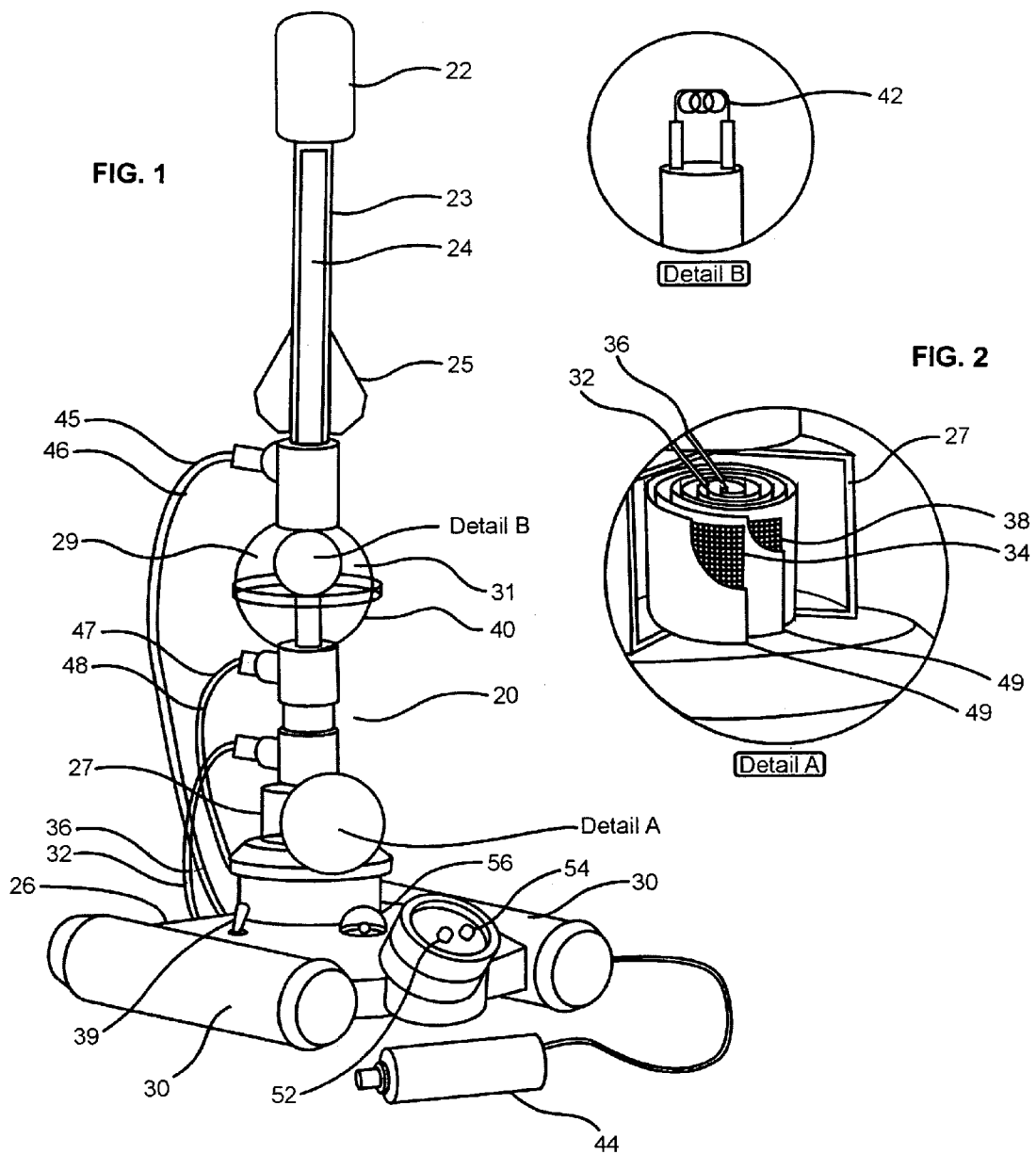

HYDROGEN POWERED TOY ROCKET UTILIZING HYDROGEN FROM THE ELECTROLYSIS OF WATER

This application is a continuation-in-part of application Ser. No. 10/348,830 filed Jan. 22, 2003, now U.S. Pat. No. 6,820,840, entitled Hydrogen Powered Toy Rocket Utilizing Hydrogen from the Electrolysis of Water which was a continuation of provisional application 60/353,161 filed Jan. 30, 2002 entitled Toys and Power Driven Equipment Utilizing Hydrogen From the Electrolysis of Water.

BACKGROUND OF THE INVENTION

It is well known to use electrolysis to separate water into its hydrogen and oxygen components. However, the designing and building of a reusable toy rocket assemblage using the components of electrolysis has always been believed to be unattainable and uneconomical and thus while desirable has eluded legions of designers and developers.

SUMMARY OF THE INVENTION

In accordance with the present invention there has been developed a novel toy system that uses simple and inexpensive sources of power and ignition systems to bring about the electrolysis of water and ignite the hydrogen component and capture the explosive power obtained therefrom to power a toy rocket. The power generated is directed in a simple, and efficient and safe manner to drive the toy rocket.

Other features and advantages will be apparent from the following drawings and descriptions thereof in which;

FIG. 1 is a perspective view of the toy rocket launcher assembly showing the rocket located on a launch tube prior to firing;

FIG. 2 is an enlarged view, partially broken away of Detail A, to illustrate the chamber wherein electrolysis takes place and hydrogen and oxygen are generated;

FIG. 3 is an enlarged view, partially broken away of Detail B, to illustrate the glow wire in the plenum chamber which is energized to explode the hydrogen and oxygen gas mixture to launch the rocket.

Figure 4:
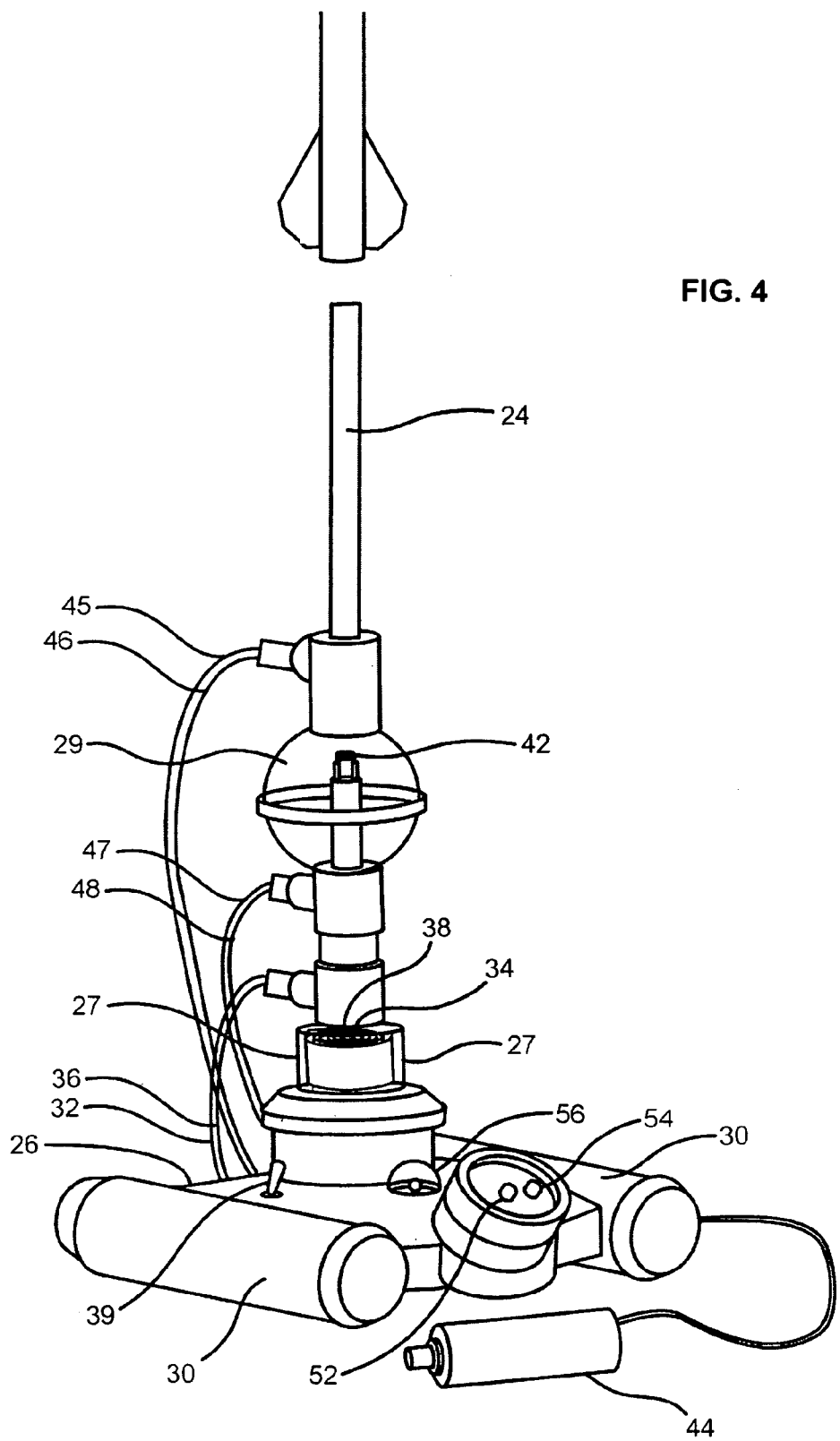
FIG. 4 is a perspective view similar to FIG. 1 with the rocket in the blast-off position.

Referring to FIGS. 1, 2 and 3, the various components of the rocket assembly will be described.

The rocket assembly 20 includes a toy rocket 22 comprising a tubular housing 23 that is positioned for launching on a launch tube 24. The tubular housing 23 is provided with fins 25. It is to be noted that the water to be used for the supply of hydrogen and oxygen gases is introduced through the launch tube 24 which is merely one way that this can be done.

The rocket assembly includes a base assembly 26 above which is located a chamber 27 into which the water is poured and wherein the anode 34 and cathode 38 are located. Included in the base assembly are battery packs 30 for supplying power to the various components requiring power. Specifically, wire 32 directs electricity to the anode 34 and wire 36 feeds electricity to the cathode 38.

A power switch 39 controls the flow of electricity to a safety switch (not shown) through wires 45 and 46 allowing electricity to the anode 34 and the cathode 38 in chamber 27 to bring about the electrolysis of the water to generate oxygen gas 29 and hydrogen gas 31 therein, which gasses 29, 31 are collected in the plenum chamber 40. In chamber 27 the anode 34 and the cathode 38 are separated by a mesh 49 that allows for the constant flow of liquid between the cathode 38 and anode 34. If desired, citric acid could be added to accelerate electrolysis. It is further noted that there is an LED 52 which is illuminated when electricity is being supplied to anode 34 and cathode 38.

Also located in plenum chamber 40 is a glow wire assembly 42 which when electricity is provided thereto by activating the ignition switch 44 the hydrogen-oxygen gas mixture in chamber 40 explodes to drive the rocket off its launch tube as shown in FIG. 4.

METHOD OF OPERATION

In FIG. 1 the system is in an intermediate stage wherein the power switch 39 is turned on to start the electrolysis that functions to provide oxygen gas 29 and hydrogen gas 31 in chamber 27, plenum 40 and launch tube 24. The rocket 22 sits atop the launch tube 24 and acts as the upper seal while the anode 34 and the cathode 38 generate hydrogen gas 31 and oxygen gas 29 in chamber 27. When sufficient amounts of hydrogen gas 31 and oxygen gas 29 have been generated in chamber 27, plenum 40 and launch tube 24, electrolysis stops by a generation control switch (not shown) and LED 54 is illuminated and the rocket is ready to launch. An explosive hydrogen and oxygen gas mixture surrounds the glow wire 42 located in plenum 40. The ignition switch 44 provides electricity to the glow wire 42 through wires 47 and 48 in conjunction with level switch 56 and the hydrogen gas mixture explodes with a large force to launch the rocket as shown in FIG. 4.

The above process can be repeated and provides an endless source of enjoyment for the user.

It is to be noted that while a single common chamber containing the anode and cathode is employed in the instant embodiment, separate chambers can be used for generating hydrogen and oxygen and a valve means for controlling the flow of gasses to the plenum chamber 40 as disclosed in the co-pending parent application Ser. No. 10/348,830 filed Jan. 22, 2003. In this embodiment a glow wire would be used for ignition. In each of the embodiments the unit could be operated by a remote control for ignition.

It is intended to cover by the appended claims all modifications and embodiments that fall within the true spirit and scope of the invention.

What is claimed:

1. A toy rocket assembly including a first chamber containing a water solution, an anode and a cathode in said chamber, a power supply for said anode and cathode to generate by electrolysis oxygen and hydrogen in said chamber, a plenum chamber for collecting the hydrogen and oxygen gasses from the electrolysis of water in the first chamber, a launch tube in communication with said plenum, a toy rocket disposed over said launch tube and igniting means for exploding said oxygen and hydrogen mixture in said plenum chamber to drive said rocket off of said launch tube into the atmosphere.

2. A toy rocket assemblage as set forth in claim 1 in which the igniting means in said plenum chamber includes a glow wire.

3. A toy rocket assemblage as set forth in claim 2 in which the plenum chamber in which the glow wire is located is generally spherical.

4. A toy rocket assemblage as set forth in claim 1 in which the anode and cathode in said first chamber ARE separated by a mesh member that allows for constant flow of liquid between the cathode and anode.

5. A toy rocket assemblage as set forth in claim 1 in which an LED is provided and illuminated when electricity is being supplied to the anode and cathode.

6. A toy rocket assemblage as set forth in claim 5 in which an LED is provided and illuminated when the rocket is ready to launch.

* * * * *